(12) United States Patent
Singh et al.

(10) Patent No.: US 7,513,553 B2
(45) Date of Patent: Apr. 7, 2009

(54) AUTOMOTIVE STORAGE SYSTEM WITH MANUALLY REPOSITIONABLE BIN

(75) Inventors: Kaushlendra Singh, Romulus, MI (US); Peter Bejin, Northville, MI (US); Michael Whitens, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 296 days.

(21) Appl. No.: 11/467,716

(22) Filed: Aug. 28, 2006

(65) Prior Publication Data

US 2008/0048466 A1 Feb. 28, 2008

(51) Int. Cl.
*B60R 7/04* (2006.01)

(52) U.S. Cl. ....................................... 296/37.8

(58) Field of Classification Search ............... 296/37.8, 296/37.9, 37.15, 37.16, 24.34, 70, 1.09; 224/548, 224/555, 556
See application file for complete search history.

(56) References Cited

U.S. PATENT DOCUMENTS

| 3,311,276 | A | | 3/1967 | Fromm | |
|---|---|---|---|---|---|
| 4,943,111 | A | * | 7/1990 | VanderLaan | ........... 297/188.17 |
| 5,071,049 | A | | 12/1991 | Mozer | |
| 5,150,406 | A | | 9/1992 | Dunchock | |
| 5,280,870 | A | * | 1/1994 | Chick et al. | ............... 248/311.2 |
| 5,516,191 | A | | 5/1996 | McKee | |
| 5,573,214 | A | * | 11/1996 | Jones et al. | ............... 248/311.2 |
| 5,702,041 | A | | 12/1997 | Sun et al. | |
| 6,692,053 | B1 | | 2/2004 | Smith | |
| 6,719,343 | B2 | | 4/2004 | Emerling et al. | |
| 6,908,135 | B2 | | 6/2005 | Stahmer et al. | |
| 7,237,816 | B1 | * | 7/2007 | Singh et al. | ............... 296/24.34 |
| 7,258,381 | B2 | * | 8/2007 | Sturt et al. | ................ 396/24.34 |
| 2005/0035618 | A1 | * | 2/2005 | Toth et al. | ................. 296/24.34 |
| 2007/0182183 | A1 | * | 8/2007 | Lota | ......................... 296/24.34 |
| 2008/0143135 | A1 | * | 6/2008 | Singh et al. | ................. 396/37.8 |

FOREIGN PATENT DOCUMENTS

JP 08156670 A 6/1996
JP 2003205780 A 7/2003

* cited by examiner

*Primary Examiner*—H Gutman
(74) *Attorney, Agent, or Firm*—Dickinson Wright PLLC; Greg Brown

(57) ABSTRACT

A storage system for an automotive vehicle includes a storage module having opposing sidewalls and a primary storage compartment situated between the opposing sidewalls. A repositionable bin has a first position in which it is mounted at least partially within the primary storage compartment and at least one secondary position in which the repositionable bin is removably mounted to an interior surface of the vehicle, such as upon an exterior surface of the storage module.

17 Claims, 4 Drawing Sheets

AUTOMOTIVE STORAGE SYSTEM WITH MANUALLY REPOSITIONABLE BIN

BACKGROUND OF THE INVENTION

1. Field of the Invention

The present invention relates to a storage system for installation within the interior of an automobile, in which a storage bin may be repositioned manually at various locations about the inside and exterior of a storage unit such as a center console.

2. Disclosure Information

Since the dawn of the automotive age, designers of car interiors have devoted a good deal of time and attention to storage issues. Automotive interior storage presents a particular challenge because it is desirable to furnish motorists with a maximum number of storage options, but without making the interior of the vehicle look cluttered. More specifically, the provision of containers for car litter has continued to present an even greater challenge as the amount of detritus generated within vehicles increases due to tendencies such as an increase in the consumption of fast food and drinks in plastic bottles during motoring.

A storage system according to the present invention provides repositionable, expandable storage, which is easily stowed in an aesthetic package.

SUMMARY OF THE INVENTION

A storage system for an automotive vehicle includes a storage module having opposing sidewalls, with a primary storage compartment being situated between the opposing sidewalls. A repositionable bin has a first position in which the repositionable bin is mounted at least partially within the primary storage compartment, and at least one secondary position in which the repositionable bin is mounted to an exterior surface of the storage module. In one embodiment, a storage module comprises a center console. In another embodiment, the storage module comprises an armrest mounted to a door trim panel of a vehicle.

The primary storage compartment of the present storage system includes a front wall having an aperture which is closed when the repositionable bin is mounted in its first position partially within the primary storage compartment.

The repositionable bin of the present invention may have several secondary positions, including a position at a rear portion of a center console, or at a side portion of a center console, or at the front or trailing ends of a door-mounted armrest.

In a first embodiment, a repositionable bin according to the present invention is mountable in its secondary position by a dovetail system having a first portion attached to the repositionable bin and a second portion attached to an exterior surface of a storage module or other vehicular interior surface. The repositionable bin may alternatively be mounted by a hook and bar system, or by a stud and pocket system, with both of these latter systems having first portions attached to the bin and second portions attached to an exterior surface of a storage module or other interior vehicle surface.

The previously described dovetail provision for mounting a repositionable bin to either an exterior portion of the storage module, or to some other interior surface of a vehicle, may advantageously be rendered as male portion attached to the repositionable bin, and a female portion attached such an interior surface, with the male portion being yieldable relative to the female portion such that imposition of a load upon the bin sufficient to separate the bin without slidingly disengaging the dovetail system will be sufficient to plastically deform only the female portion of the dovetail system. As a result, the storage console or storage module portion, or other interior surface will be undamaged if the repositionable bin is removed aggressively, in an unprescribed manner, from one of its secondary locations.

According to another aspect of the present invention, a repositionable bin has a back wall incorporating a provision for mounting the bin upon either an exterior surface of a storage module, or upon some other interior surface of a vehicle, and a front wall having a handle for removing the repositionable bin from a first position within a storage module.

It is an advantage of a storage system according to the present invention that the storage available within a center console or door-mounted armrest may be greatly increased without increasing the package volume of the unexpanded unit.

It is a further advantage of a storage system according to the present invention that increased storage may be provided either to the front seat passengers or to the rear seat passengers of a vehicle, at the option of a vehicle's occupants.

It is a further advantage of a storage system according to the present invention that a repositionable bin is manually movable from position to another. In this context, "manually removable" means that the bin is movable without the need for any tools or other equipment.

Other advantages, as well as features and objects of the present invention, will become apparent to the reader of this specification.

DETAILED DESCRIPTION OF THE PREFERRED EMBODIMENTS

Figure 1:
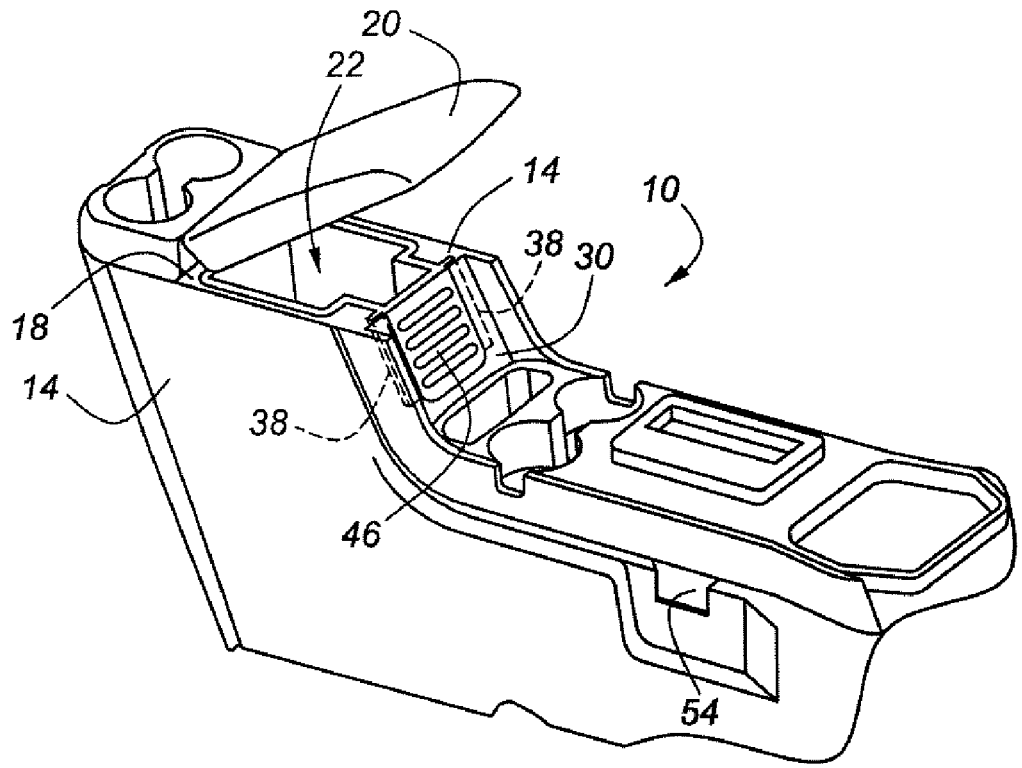
FIG. 1 is a perspective view of a storage system according to the present invention, showing a repositionable bin in its first, or primary, position.
Figure 2:
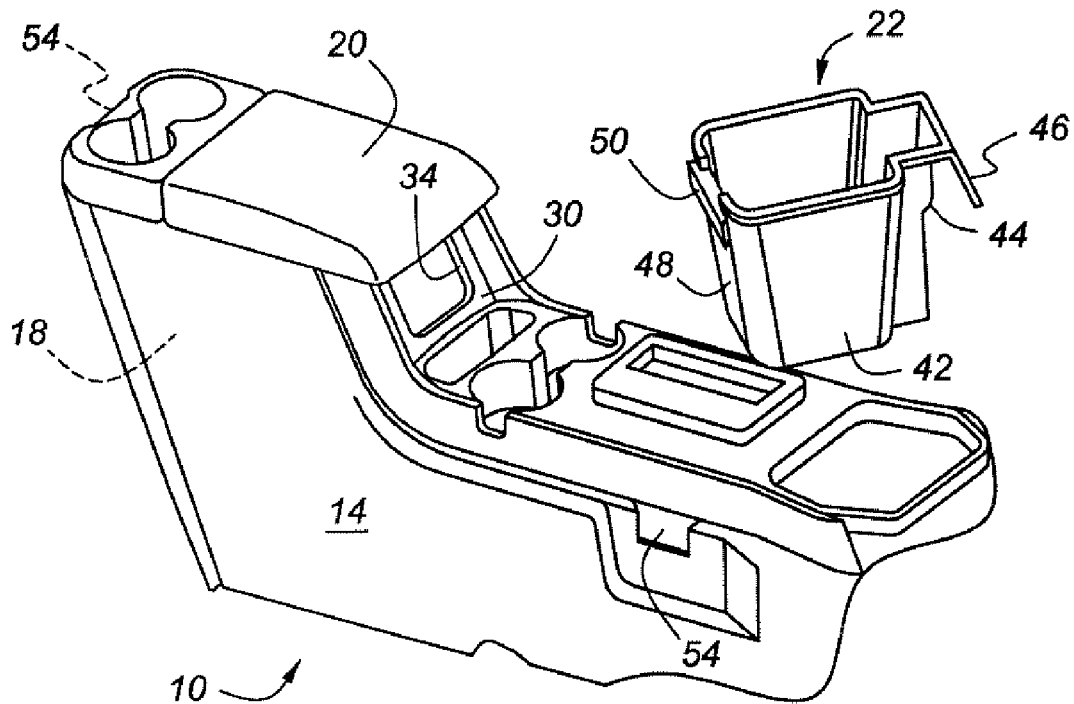
FIG. 2 shows the bin and storage module of FIG. 1, with the repositionable bin having been removed from its first position, which is partially within a storage console.
Figure 3:
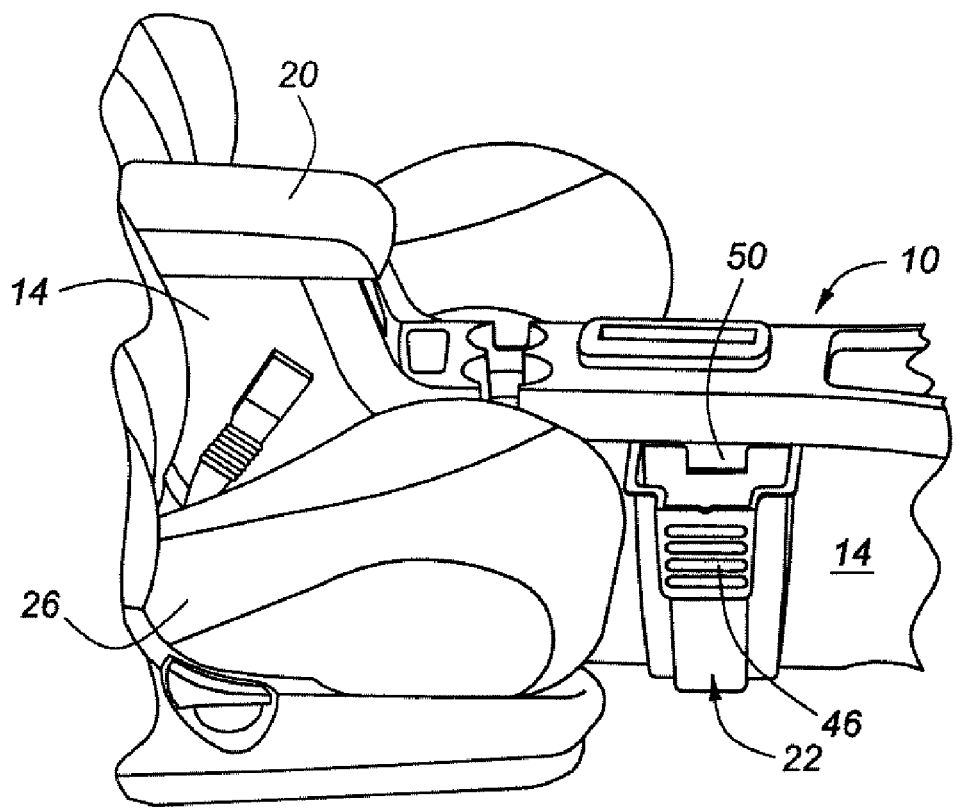
FIG. 3 illustrates a repositionable bin of the present invention mounted to the side of a center console.

As shown in FIGS. 1 and 2, storage module 10 has opposing sidewalls 14 which in part define primary storage compartment 18 situated between sidewalls 14. Hinged armrest 20 is located at an upper portion of storage module 10. Storage module 10 may comprise either a center console located between vehicle seats as shown in FIG. 3, or any other type of interior storage furnishing within a vehicle.

Primary storage compartment 18 within storage module 10 houses a repositionable bin, 22, which is shown in its first position in FIG. 1. While in the first position, handle 46 of bin 22 projects from the front of storage compartment 18.

Bin 22 is shown in FIG. 2 as having been removed from storage compartment 18. Bin 22 includes a body, 42, having a front wall, 44, to which handle 46 is attached, and a rear wall, 48, having a male dovetail, 50, attached thereto. Details of rear wall 48 and male dovetail 50 are best seen in FIG. 2. FIG. 2 also shows that aperture 34, at the front of storage compartment 18, is open once repositionable bin 22 has been removed from primary storage compartment 18. Aperture 34 allows objects to be more easily removed from storage compartment 18 once bin 22 has been repositioned to another location within the vehicle's interior.

Figure 4:
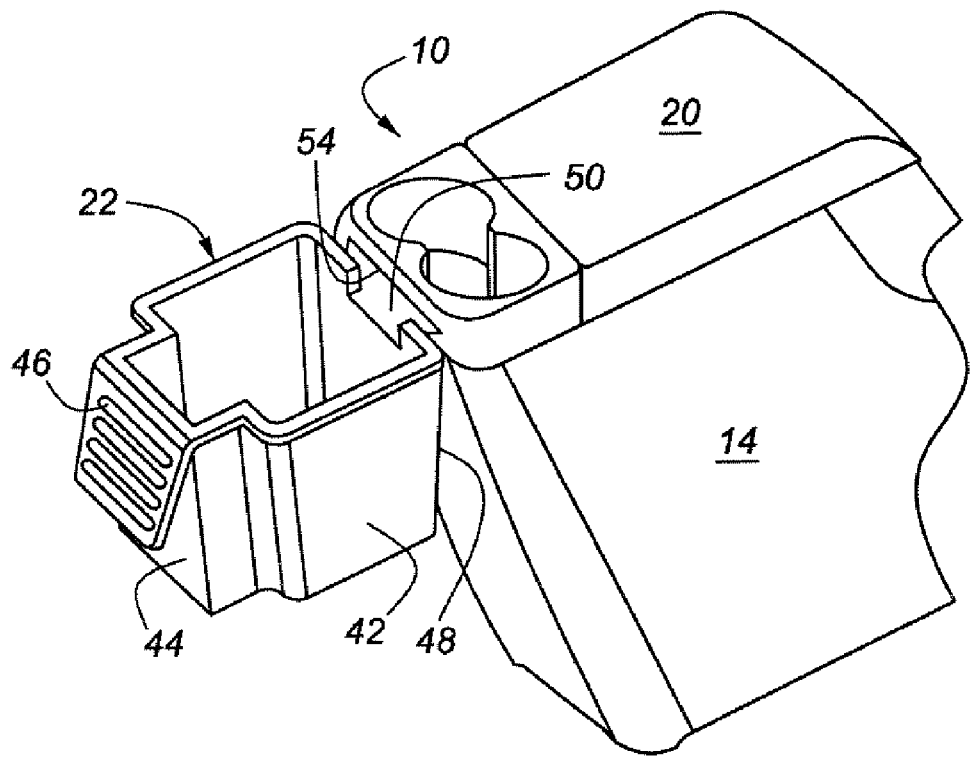
FIG. 4 illustrates a repositionable bin mounted to the rear portion of a center console.

As shown in FIGS. 1 and 2, storage module 10 incorporates female dovetail 54 at a front passenger side of storage module 10. Further, as shown in FIGS. 2 and 4, storage module 10 has an additional female dovetail 54 located at a rear portion of storage module 10. Accordingly, once repositionable bin 22 has been removed from primary storage compartment 18, it may be locked in place at any secondary position wherein a female dovetail 54 has been placed. Repositionable bin 22 is shown in FIG. 3 as being locked to the side of storage module 10.

Handle 46, which is shown with particularity in FIGS. 2 and 4, functions not only as a handle, but also as a closure panel for aperture 34 formed in the front portion, 30, of primary storage compartment 18. Repositionable bin 22 is slidably mounted into storage module 10 by means of channels 38 formed in sidewalls 14, as shown in FIG. 1.

Figure 5:
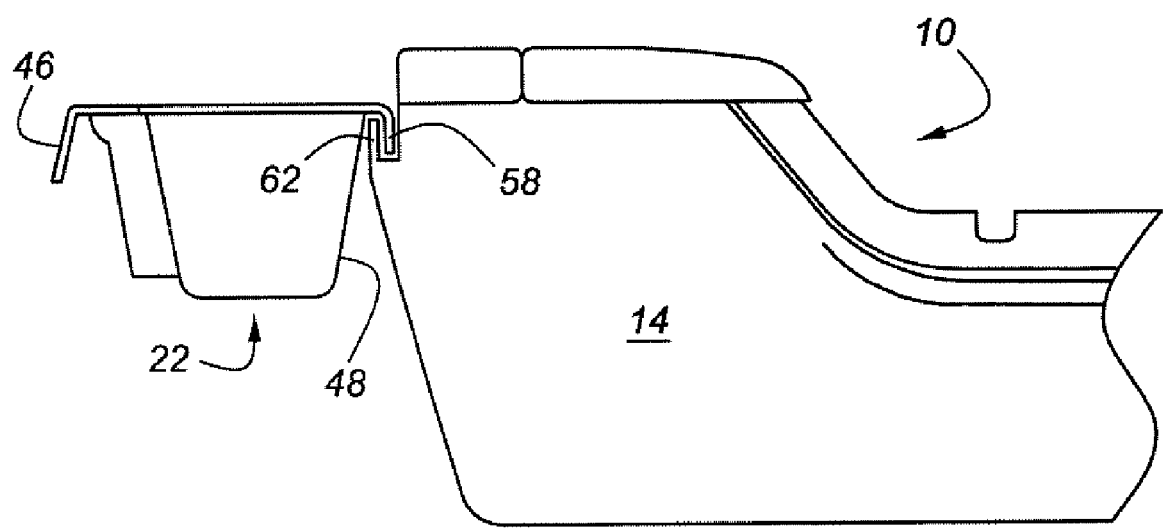
FIG. 5 illustrates an embodiment for mounting the repositionable bin according to the present invention with a hook and bar arrangement.
Figure 6:
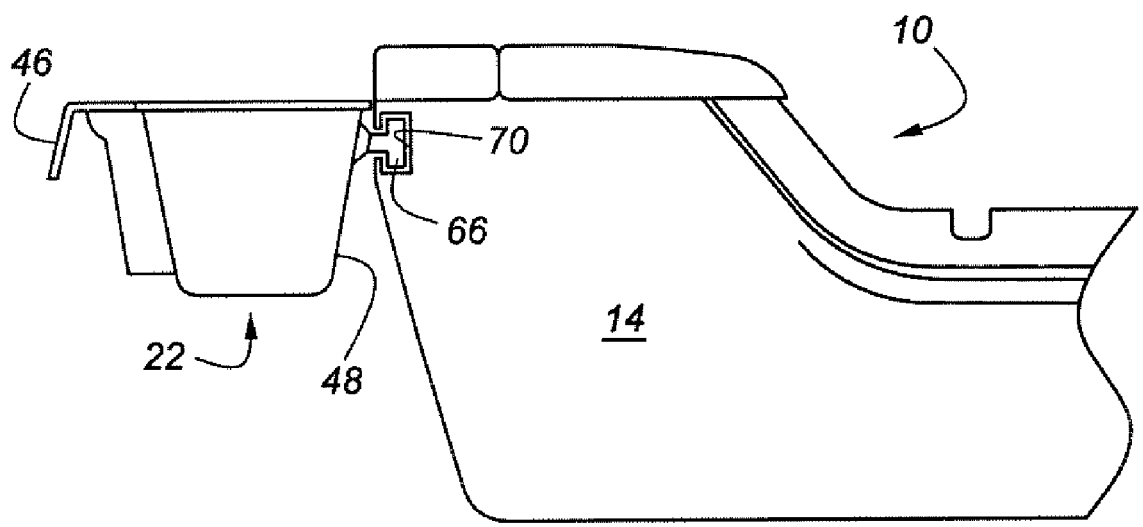
FIG. 6 illustrates a stud and pocket system for mounting a repositionable bin according to the present invention.

In the embodiment of FIG. 5, hook 58, which is formed upon rear wall 48 of bin body 42, engages a bar, 62, which is carried upon storage module 10. In similar fashion, in the embodiment of FIG. 6, a stud, 66, or, preferably, two studs 66, with one being shown in FIG. 6, are formed upon rear wall 48 of body 42, with each stud engaging a slot, 70, formed in a rear portion of storage module 10.

Figure 7:
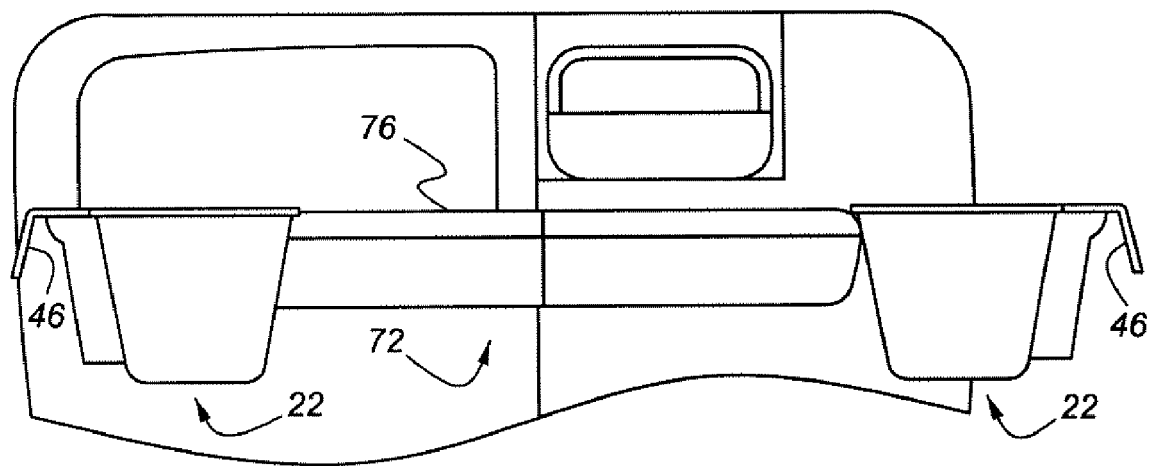
FIG. 7 illustrates an armrest which is mounted to a door trim panel and has repositionable storage bins according to the present invention.

With the embodiment shown in FIG. 7, door armrest 72, having an armrest panel, 76, has positions at both its front and rear terminations for a repositionable bin 22. The rearmost position for bin 22 of FIG. 7 is at an exterior portion of armrest 72, so as to allow usage of the bin by a rear seat passenger within a vehicle.

While particular embodiments of the invention have been shown and described, numerous variations and alternate embodiments will occur to those skilled in the art. Accordingly, it is intended that the invention be limited only in terms of the appended claims.

What is claimed is:

1. A storage system for an automotive vehicle, comprising:
    a storage module having opposing sidewalls and a primary storage compartment situated between said opposing sidewalls; and
    a repositionable bin having a first position in which said repositionable bin is mounted at least partially within said primary storage compartment, and at least one secondary position in which said repositionable bin is removably mounted to an exterior surface of said storage module, wherein said repositionable bin comprises a back wall having a provision for mounting the repositionable bin upon said exterior surface of said storage module, and a front wall having a handle for removing the repositionable bin from a first position within said storage module.

2. A storage system according to claim 1, wherein said storage module comprises a center console.

3. A storage system according to claim 1, wherein said storage module comprises an armrest adapted for mounting to an interior portion of an automotive door.

4. A storage system according to claim 1, wherein said primary storage compartment comprises a front wall having an aperture which is closed when said repositionable bin is mounted in said first position.

5. A storage system according to claim 1, wherein said storage module comprises a center console, with said at least one secondary position being located at a rear portion of said center console.

6. A storage system according to claim 1, wherein said storage module comprises a center console, with said at least one secondary position being located at a side portion of said center console.

7. A storage system according to claim 1, wherein said repositionable bin is mountable in said secondary position by a dovetail system having a first portion attached to said repositionable bin, and a second portion attached to said exterior surface of said storage module.

8. A storage system according to claim 1, wherein said repositionable bin is mountable in said secondary position by a hook and bar system having a first portion attached to said repositionable bin, and a second portion attached to said exterior surface of said storage module.

9. A storage system according to claim 1, wherein said repositionable bin is mountable in said secondary position by a stud and pocket system having a first portion attached to said repositionable bin and a second portion attached to said exterior surface of said storage module.

10. A storage system according to claim 1, wherein said repositionable bin is slidably mounted between said opposing sidewalls while in said first position.

11. A storage system according to claim 1, wherein said repositionable bin is mountable in said secondary position by a dovetail system having a male portion attached to said repositionable bin, and a female portion attached to said exterior surface of said storage module, and with said male portion being yieldable relative to said female portion, such that imposition of a load upon said repositionable bin sufficient to separate the repositionable bin from the storage module without slidingly disengaging the dovetail system will be insufficient to plastically deform only the female portion of said dovetail system.

12. A storage system according to claim 1, wherein said repositionable bin is manually removable from said exterior surface of said storage module.

13. A storage system according to claim 1, wherein said repositionable bin is manually movable from said first position to said at least one secondary position.

14. A storage system for an automotive vehicle having at least one interior surface, comprising:
    a center console having opposing sidewalls and a primary storage compartment situated between said opposing sidewalls and topped with a hinged armrest; and
    a manually removable, repositionable bin having a first position in which said repositionable bin is mounted at least partially within said primary storage compartment, and a plurality of secondary positions located upon exterior surfaces of said console.

15. A storage system according to claim 14, wherein said repositionable bin is slidably mounted to said center console while in said first position and mounted by a dovetail system while in said secondary positions.

16. A storage system according to claim 14, wherein said repositionable bin is slidably mounted to said center console while in said first position and mounted by a hook and bar system while in said secondary positions.

17. A storage system according to claim 15, wherein said repositionable bin is slidably mounted to said center console while in said first position and mounted by a stud and slot system while in said secondary positions.

* * * * *